United States Patent
Liu

(10) Patent No.: US 8,878,678 B2
(45) Date of Patent: Nov. 4, 2014

(54) METHOD AND APPARATUS FOR PROVIDING AN INTELLIGENT MUTE STATUS REMINDER FOR AN ACTIVE SPEAKER IN A CONFERENCE

(75) Inventor: Yanghua Liu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 235 days.

(21) Appl. No.: 13/482,173

(22) Filed: May 29, 2012

(65) Prior Publication Data

US 2013/0321156 A1   Dec. 5, 2013

(51) Int. Cl.
G08B 23/00 (2006.01)

(52) U.S. Cl.
USPC .......... 340/573.1; 340/500; 379/162

(58) Field of Classification Search
USPC ...................................... 340/573.1
See application file for complete search history.

(56) References Cited

U.S. PATENT DOCUMENTS

| 5,680,393 | A  | * | 10/1997 | Bourmeyster et al. | ......... 370/286 |
| 6,870,919 | B2 | * | 3/2005 | Dobler | .......... 379/207.02 |
| 7,720,217 | B1 | * | 5/2010 | Connolly | ............ 379/421 |
| 7,848,511 | B2 | * | 12/2010 | Dresher et al. | ........ 379/421 |
| 8,019,078 | B2 | * | 9/2011 | Chavez et al. | ........ 379/421 |
| 8,620,653 | B2 | * | 12/2013 | Cutler | ................ 704/233 |
| 2006/0280295 | A1 | * | 12/2006 | Runcie | ......... 379/88.26 |
| 2012/0020469 | A1 |   | 1/2012 | Brown et al. | |

\* cited by examiner

*Primary Examiner* — Kerri McNally
(74) *Attorney, Agent, or Firm* — P. Su

(57) ABSTRACT

In one embodiment, a method includes capturing samples of sound associated with an environment, and processing the samples of sound to determine whether the samples of sound likely include voice activity. The samples of sound are captured while a microphone is muted. When it is determined that the samples of sound likely include the voice activity, the method also includes providing a first notification arranged to indicate that voice activity is detected and that the microphone is muted.

22 Claims, 6 Drawing Sheets

METHOD AND APPARATUS FOR PROVIDING AN INTELLIGENT MUTE STATUS REMINDER FOR AN ACTIVE SPEAKER IN A CONFERENCE

TECHNICAL FIELD

The disclosure relates generally to network based services. More particularly, the disclosure relates to enabling an endpoint associated with a conference or meeting to provide a speaker with a notification that a microphone of the endpoint is muted when the endpoint detects that the speaker is speaking while the microphone is muted.

BACKGROUND

During calls, e.g., phone calls and/or conference calls, may participants may activate a muting function when they are not actively participating in a call. By way of example, if a participant in a conference call is not speaking, the participant may mute his or her microphone so that he or she may carry on a conversation outside of the conference call without being heard by other participants in the conference call.

Often, a participant in a call who has muted a microphone on his or her phone may forget that the microphone. Thus, when such a "muted participant" becomes an active speaker and begins to speak intentionally into the microphone, because the microphone is muted, other participants in the call are unable to hear anything spoken by the now-active speaker. Often, unless one of the other participants tells the now-active speaker that they are unable to hear him or her, the now-active speaker may not realize that his or her microphone is muted and may continue to speak.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes capturing samples of sound associated with an environment, and processing the samples of sound to determine whether the samples of sound likely include voice activity. The samples of sound are captured while a microphone is muted. When it is determined that the samples of sound likely include the voice activity, the method also includes providing a first notification arranged to indicate that voice activity is detected and that the microphone is muted.

DESCRIPTION

When a participant in a call or a meeting, as for example an audio conference or a web meeting, mutes the microphone on his or her phone, the participant may begin to speak without realizing that the microphone is muted. As a result, comments made by such a participant may not be heard by other participants in the call or meeting. Often, a participant who has muted the microphone on his or her phone is unaware that other participants are unable to hear his or her comments until the other participants warn him or her that the microphone is muted.

Detecting when a speaker is speaking into a muted microphone, and warning or otherwise reminding the speaker that his or her microphone is muted, allows the speaker to efficiently realize when his or her microphone is muted. In one embodiment, intelligent mute status reminder functionality may be implemented on a phone or an endpoint associated with a conference call to detect when a speaker is speaking into a muted microphone, and to notify the speaker that he or she is speaking into a muted microphone.

Determining when a speaker is likely speaking into a muted microphone may include, but is not limited to determining, when sound or voice energy is higher than a baseline level for a predetermined period of time. When it is determined that a speaker is likely speaking into a muted microphone, the speaker may be provided with an audio and/or visual reminder that his or her microphone is muted. Such a reminder effectively indicates to the speaker that his or her microphone is muted when the speaker is detected to be speaking. A speaker may have a phone that includes a general indication that a microphone is muted. Providing a reminder to the speaker that a microphone on his or her phone is muted when the speaker is detected to be speaking, e.g., when voice activity is detected with respect to the phone, provides an additional layer of notification to the speaker.

Figure 1:
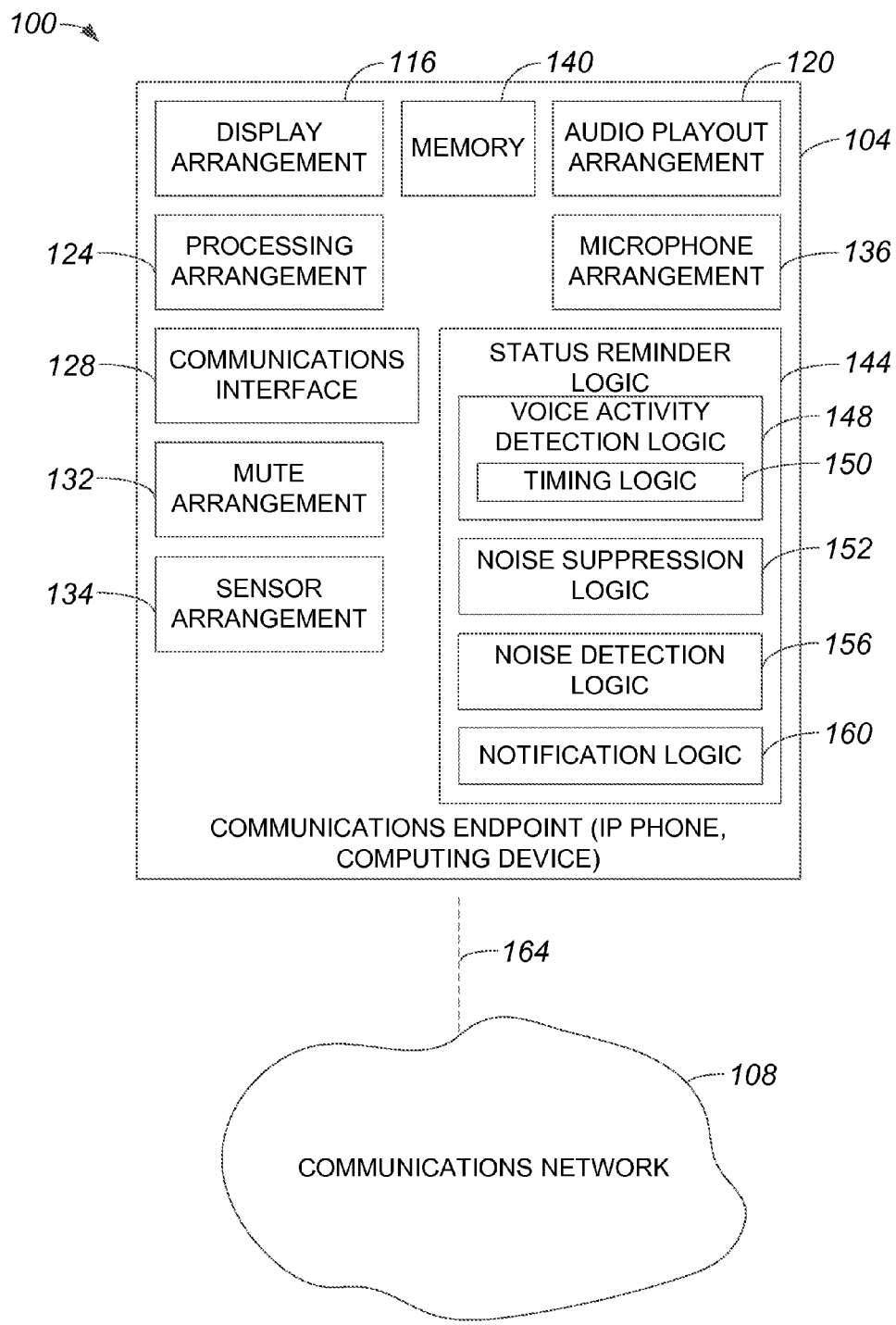
FIG. 1 is a block diagram representation of a system that includes a device, e.g., a communications endpoint, associated with a communications network in accordance with an embodiment.

Referring initially to FIG. 1, a communications endpoint, e.g., a phone or a computing device, that is arranged to provide an intelligent mute status reminder to a speaker who is detected to be speaking into a muted microphone will be described in accordance with an embodiment. An overall system or network 100 includes a communications endpoint 104 that communications with a communications network 108. Communications endpoint 104 may generally be any suitable device that is configured to communication with communications network 108 such that communications endpoint 104 may be part of a call or a communications session.

Communications endpoint 104 includes a display arrangement 116 on which information associated with a call or a communications session may be displayed, as well as an audio playout arrangement 120 that allows information associated with the call or the communications session to be presented in an audible manner. In one embodiment, display arrangement 116 may be a display screen. In another embodiment, audio playout arrangement 120 may include a speaker component.

A communications interface 128 may include an input/output port (not shown). Communications interface 128 allows communications endpoint 104 to communicate, e.g., exchange information or data, with communications network 108 across a communications link 164. As will be appreciated by those skilled in the art, communications link 164 may be a wired link or a wireless link.

Communications endpoint 104 also includes a microphone arrangement 136 and a mute arrangement 132. Microphone arrangement 136 generally includes a microphone arranged to capture sound, while mute arrangement 132 is arranged to mute and to un-mute the microphone. In other words, mute arrangement 132 may be used to mute or engage mute functionality with respect to microphone arrangement 136, as well as to un-mute or to disengage mute functionality with respect to microphone arrangement 136. In the described embodiment, microphone arrangement 136 is arranged to capture sound information, even when the microphone is muted, and to at least temporarily store the sound information in a memory 140. It should be appreciated that capturing sound information while the microphone is muted enables the sound information to be processed to determine whether voice activity is detected.

Communications endpoint 104 also includes status reminder logic 144 which may include software logic that may be executed by a processing arrangement 124. Status reminder logic 144 includes voice activity detection logic 148 which, in cooperation with a sensor 134, may determine when sound information, or samples of sound, captured by microphone arrangement indicates voice activity. Voice activity detection logic 148 may detect when sound energy associated with the sound information is higher than, for example, an ambient level of sound energy. Voice activity detection logic 148 may process sound information to determine at least one energy level associated with the sound information. When sound energy is detected by voice activity detection logic 148 and sensor 134 to be at a relatively high level for a predetermined amount of time, voice activity detection logic 148 may ascertain that voice activity has occurred, e.g., while microphone arrangement 136 is muted. By way of example, in one embodiment, when energy associated with a sample of sound is relatively high within an approximately one second to an approximately three second period of time, then the sample of sound may effectively be recognized as an active voice. It should be appreciated that voice activity detection logic 148 may be arranged to detect voice activity using any suitable method. In one embodiment, voice activity detection logic 148 may include a volume detection module and a voice recognition module, e.g., a voice recognition module that may be trained to recognize a voice of a particular user.

Voice activity detection logic 148 includes timing logic 150 that may be arranged to allow an amount of time that the energy associated with a sample of sound remains at a relatively high level in order for the sample of sound to be identified as containing voice activity to be set or otherwise defined. Timing logic 150 may also be arranged to allow an amount of time that the energy associated with a sample of sound remains at a relatively low level in order for the sample of sound to be identified as being associated with a substantially silent period, e.g., a silent period between two periods of voice activity, to be set.

Status reminder logic 144 also includes noise suppression logic 152 and noise detection logic 152. Noise suppression logic 152 may be arranged to effectively suppress noise in sound samples or information obtained while microphone arrangement 136 is muted. Suppressing noise such as ambient noise or other background noise when a sound sample is processed facilitates the identification of potential voice activity in the sound sample. Noise detection logic 156 may be arranged to detect ambient noise or other background noise in a sound sample while microphone arrangement 136 is muted.

Notification logic 160, which is also included in status reminder logic 144, is configured to provide a visual notification or indication, as for example using display arrangement 116, and/or an audible notification or indication, as for example using audio playout arrangement 120, that informs a user that voice activity has been detected while microphone arrangement 136 is muted. In other words, notification logic 160 provides a warning or a reminder to a user, when it is determined that the user has likely spoken, that his words have not been heard by anyone associated with communications network 108 because microphone arrangement 136 is muted. A visual notification may include, but is not limited to including, displaying a text box on display arrangement 116 which includes a statement intended to inform that user that status reminder logic 144 has detected an apparent attempt to speak into microphone arrangement 136 while microphone arrangement 136 is muted. An audible notification may include, but is not limited to including, an audible statement intended to inform that user that status reminder logic 144 has detected an apparent attempt to speak into microphone arrangement 136 while microphone arrangement 136 is muted.

Figure 2:
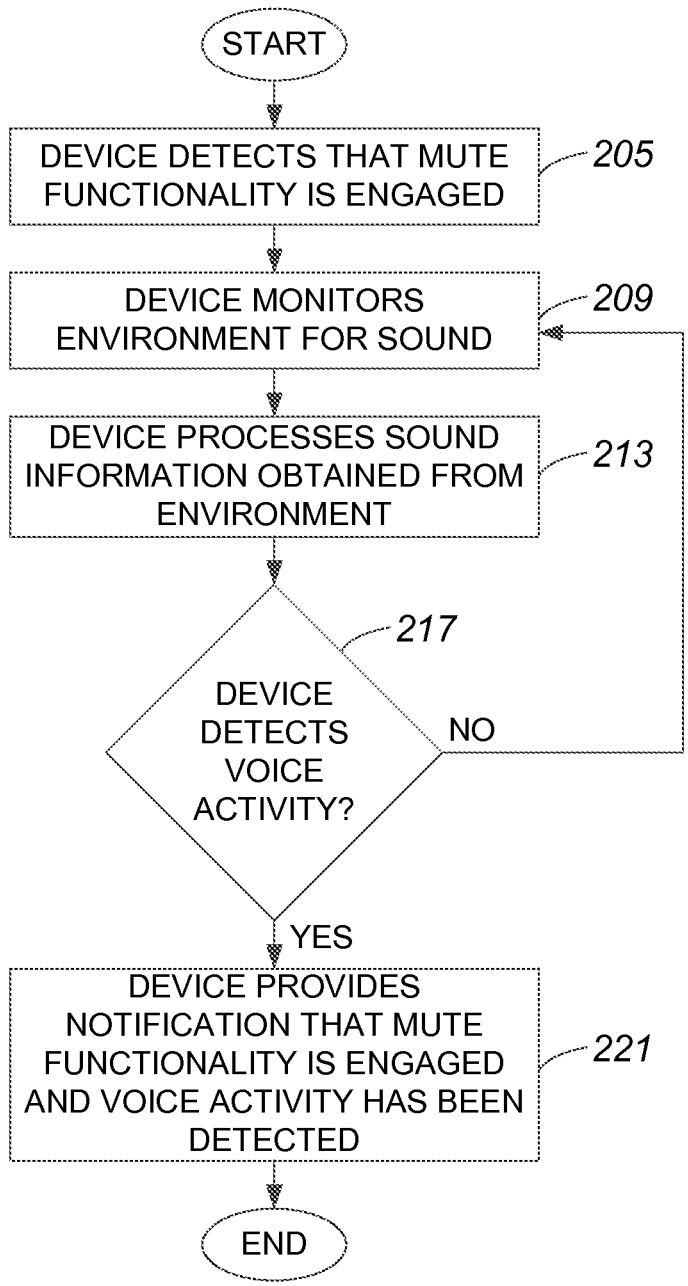
FIG. 2 is a process flow diagram which illustrates a method of operating a device that includes intelligent mute status reminder functionality during a call, e.g., an audio conference call, in accordance with an embodiment.

FIG. 2 is a process flow diagram which illustrates a method of operating a communications endpoint or a device that includes intelligent mute status reminder functionality during a call, e.g., an audio conference call, in accordance with an embodiment. A method 201 of operating a device that includes intelligent mute status reminder functionality begins at step 205 in which a device, as for example a communications endpoint, detects that mute functionality is engaged. That is, a device effectively identifies that a microphone associated with the device has been muted or otherwise at least temporarily disengaged.

Once the device detects that mute functionality is engaged, the device monitors the environment around the device for sound in step 209. The device may, in the course of monitoring the environment, effectively collect sound information. In one embodiment, the device may include a sensor that is configured to detect sound, e.g., sound energy, in the vicinity of the device. The device processes the sound information obtained from the environment in step 213. Processing the sound information may include, but is not limited to including, determining a baseline level for ambient sound in the environment, cancelling out ambient sound to facilitate the identification of voice activity, and/or characterizing sounds such that a voice may be more readily identified.

A determination is made in step 217 as to whether the device detects voice activity, e.g., whether voice activity is detected in the sound information. It should be appreciated that such a determination may include, in one embodiment, a determination as to whether more than an ambient or average amount of sound is detected by the device. If it is determined that voice activity is not detected, process flow returns to step 209 in which the device continues to monitor the environment for sound.

Alternatively, if the determination in step 217 is that voice activity is detected, the device provides a notification in step 221 that mute functionality is engaged with respect to the device and that voice activity has been detected. As previously mentioned, a notification or indication that mute functionality is engaged and that voice activity has been detected may be audio and/or visual. Once the notification that mute functionality is engaged and that voice activity has been detected is provided, as for example to a user of the device, the method of operating a device that includes intelligent mute status reminder functionality is completed.

In one embodiment, intelligent mute status reminder functionality associated with a device may be configured, e.g., by a user of the device. Configuring intelligent mute status reminder functionality may include, but is not limited to including, allowing a user to specify whether a notification that mute functionality is engaged while voice activity has been detected is to be provided, allowing a user to specify a number of notifications to be provided for each apparent voice activity event, and/or allowing a user to specify the length of a period of silence that substantially defines separate voice activity events.

Figure 3A:
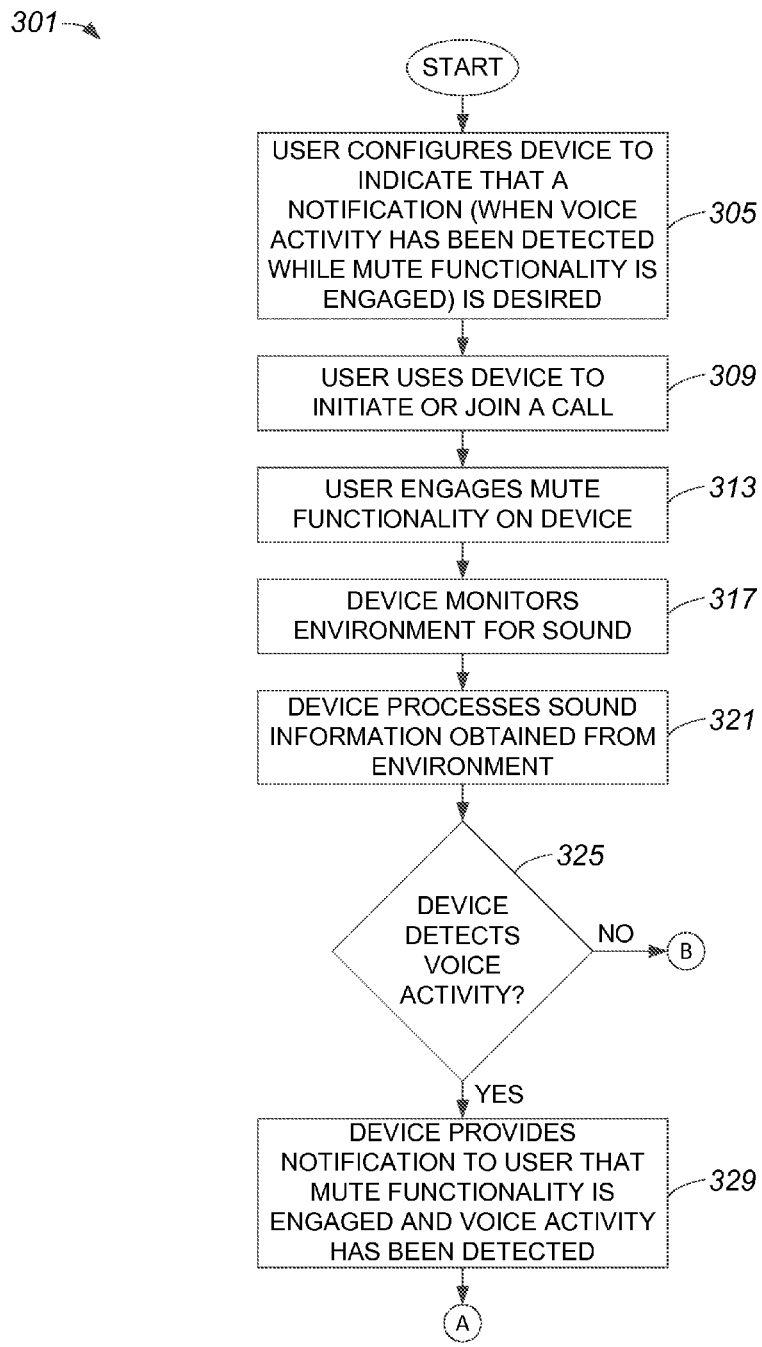
FIGS. 3A-C are a process flow diagram which illustrates a method of operating a device that includes intelligent mute status reminder functionality which may be configured by a user in accordance with an embodiment.
Figure 3B:
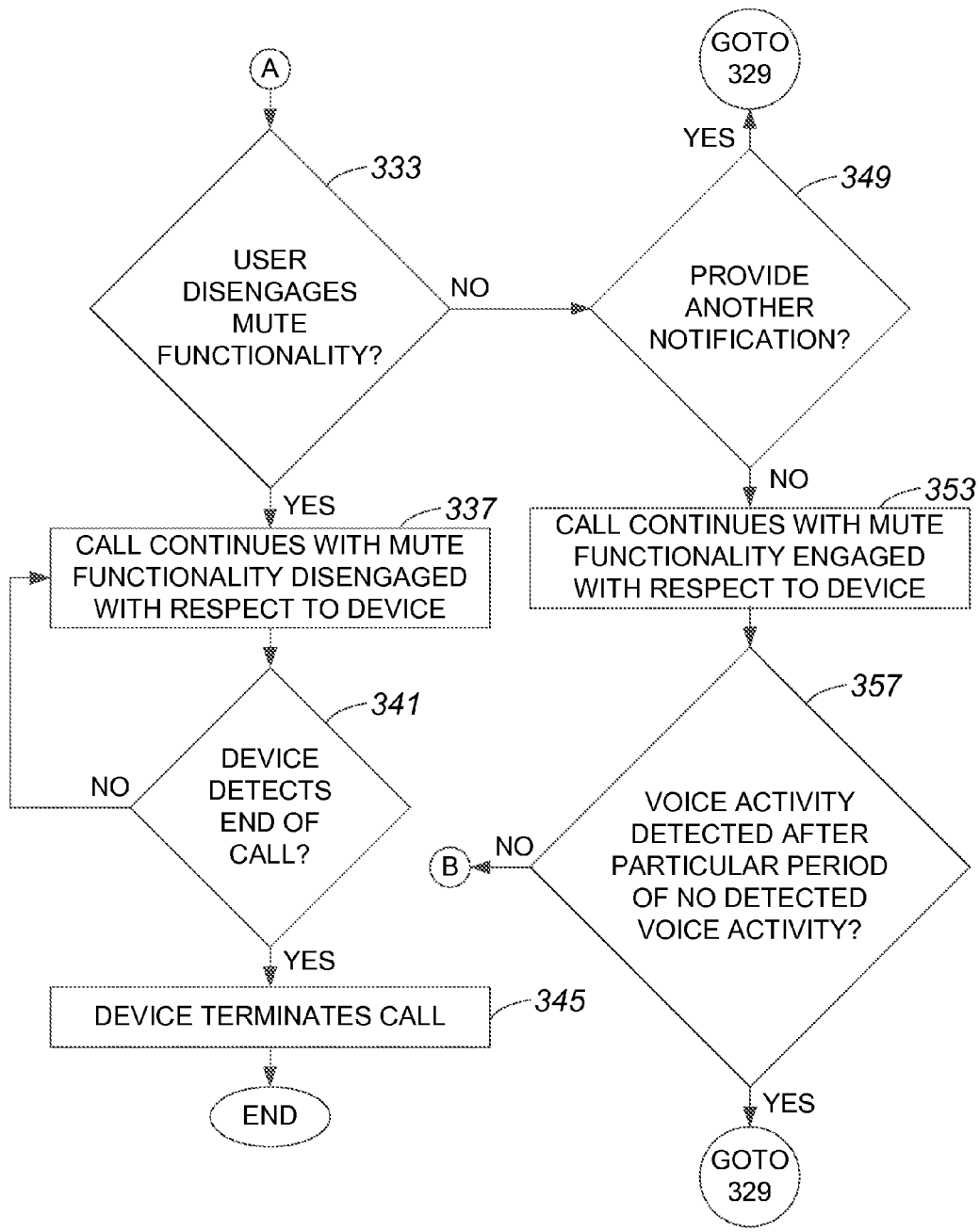
Figure 3C:
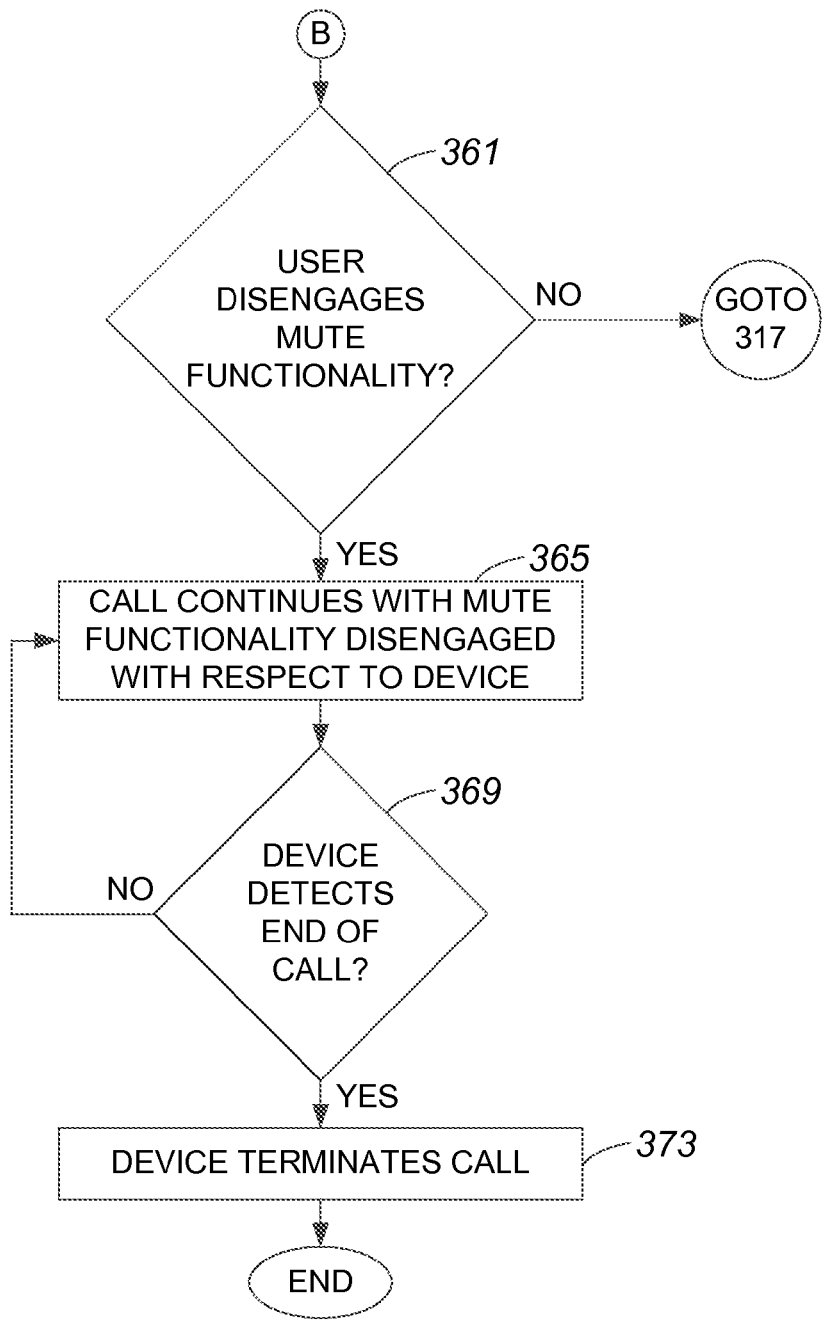

FIGS. 3A-C are a process flow diagram which illustrates a method of operating a device that includes intelligent mute status reminder functionality which may be configured by a user in accordance with an embodiment. A method 301 of operating a device that includes intelligent mute status reminder functionality begins at step 305 in which a user configures a device, e.g., a communications endpoint such as a phone or a computing device with phone capabilities, to indicate that a notification is desired. The notification may be a notification, or other indication, that voice activity has been detected while mute functionality is engaged. In one embodiment, a user may also configure the device to indicate how many notifications, e.g., warnings, are desired for each instance of detected voice activity and/or how long a period of silence between instances of voice activity being detected may be before the instances are considered as separate instances.

After the user configures the device, the user uses the device to initiate or join a call in step 309. The call may be, but is not limited to being, an audio conference call, a web conference call, or a multi-media conference call. Once the user initiates or joins the call, the user engages the mute functionality on the device in step 313. Engaging the mute functionality generally includes muting or otherwise disengaging a microphone of the device.

In step 317, the device monitors the environment for sound activity. That is, the device collects sound information or samples of sound from the environment. Collecting sound information may include, but is not limited to including, collecting energy readings from the environment, and at least temporarily storing the sound information. After collecting the sound information, the device processes the sound information in step 321 to determine if any of the sound information indicates voice activity. In one embodiment, it is determined whether processing the sound information results in an assessment that the sound information likely contains voice activity.

A determination is made in step 325 as to whether the device has detected voice activity. If the determination is that the device has detected voice activity, then in step 329, the device provides notification to the user that mute functionality is engaged and that voice activity has been detected. In one embodiment, a notification may include presenting an audio and/or visual text string such as "speaking has been detected but your microphone is muted."

From step 329, process flow moves to step 333 in which it is determined whether the user has disengaged mute functionality, e.g., un-muted his or her microphone. If it is determined that the user has disengaged mute functionality, the indication is that the detected voice activity was speech intended for distribution by the microphone with respect to the call. As such, in step 337, the call continues with the mute functionality disengaged. For ease of illustration, once mute functionality is disengaged, it is assumed that the mute functionality remains disengaged. It should be appreciated, however, that a user may repeatedly mute and un-mute his or her microphone throughout the duration of a call.

In step 341, it is determined whether the device has detected an end to the call. If an end to the call is not detected, then process flow returns to step 337 in which the call continues. Alternatively, if an end to the call is detected, then the device terminates the call in step 345, and the method of operating a device that includes intelligent mute status reminder functionality is completed.

Returning to step 333, if it is determined that the user has not disengaged mute functionality, then the implication is that either voice activity was erroneously detected, or that any voice activity that was detected was not intended for distribution with respect to the call, e.g., the user may have been speaking to someone in the same room as the user. Accordingly, in step 349, it is determined whether another notification that mute functionality is engaged and that voice activity has been detected is to be provided. Any number of notifications may generally be provided and, as mentioned above, the number of notifications which may be provided may be configured by a user. In addition, the amount of time between notifications may also be configured by a user.

If the determination in step 349 is that another notification is to be provided, process flow returns to step 329 in which the device provides notification to the user that mute functionality is engaged and that voice activity has been detected. Alternatively, if it is determined that another notification is not to be provided, then the call continues in step 353 with mute functionality engaged. In general, while the call continues, the device may continue to obtain and to process sound information obtained from the environment.

A determination is made in step 357 as to whether voice activity has been detected after a particular period of substantially no detected voice activity. That is, it is determined whether a separate instance of voice activity, or an instance of voice activity that may be considered to effectively be distinct from the instance of voice activity identified as being detected in step 325, has been identified. In one embodiment, if there is effectively silence, or substantially only ambient noise, for a particular period of time before voice activity is once again detected, then the detected voice activity may be considered to be a separate instance of voice activity. Thus, the indication is that a notification that mute functionality is engaged and that voice activity has been detected may be provided. Therefore, if voice activity is detected after a particular period of substantially no detected voice activity in step 357, process flow returns to step 329 in which the device provides notification to the user that mute functionality is engaged and that voice activity has been detected.

Alternatively, if voice activity is not detected after the particular period of substantially no detected voice activity in step 357, the indication may be that either additional detected voice activity is part of the same instance of voice activity identified as being detected in step 325, or no additional voice activity has been detected. As such, process flow moves from step 357 to step 361 in which it is determined whether the user has disengaged mute functionality. If the determination is that the user has not disengaged mute functionality, process flow returns to step 317 in which the device continues to monitor the environment for sound. On the other hand, if the determination is that the user has disengaged mute functionality, then in step 365, the call continues with the mute functionality disengaged. As previously mentioned, for purposes of illustration, once mute functionality is disengaged, it is assumed that the mute functionality remains disengaged. It should be appreciated, however, that a user may repeatedly mute and un-mute his or her microphone throughout the duration of a call.

It is determined in step 369 whether the device has detected an end to the call. If an end to the call is not detected, then process flow returns to step 365 in which the call continues. Alternatively, if an end to the call is detected in step 369, then the device terminates the call in step 373, and the method of operating a device that includes intelligent mute status reminder functionality is completed.

Referring back to step 325 and the determination of whether the device detects voice activity, it if is determined that the device has not detected voice activity, then process flow moves to step 361 in which it is determined whether the user has disengaged mute functionality. That is, it is determined whether the microphone of the device remains muted.

While detecting voice activity, or speaking by a participant in a call, while a microphone is muted has generally been described as effectively triggering a warning that the participant is actively participating, e.g., speaking, while the microphone is muted, other types of activity may also trigger a warning that the participant is actively participating in a call while the microphone is muted. For example, when a participant who is participating in a multi-media conference call and has muted a microphone attempts to actively participate in the multi-media conference call, the participant may be notified that he or she is actively participating while the microphone is muted. Active participation in a multi-media conference call may involve manipulating a shared window or document, initiating the sharing of a desktop, and/or inviting new participants to join the multi-media conference call. Active participation may also generally include any activity that may be considered to be likely to lead to voice activity. For instance, when a participant initiates the sharing of his or her desktop, it may be assumed that the participant will likely wish to speak to discuss his or her desktop.

Figure 4:
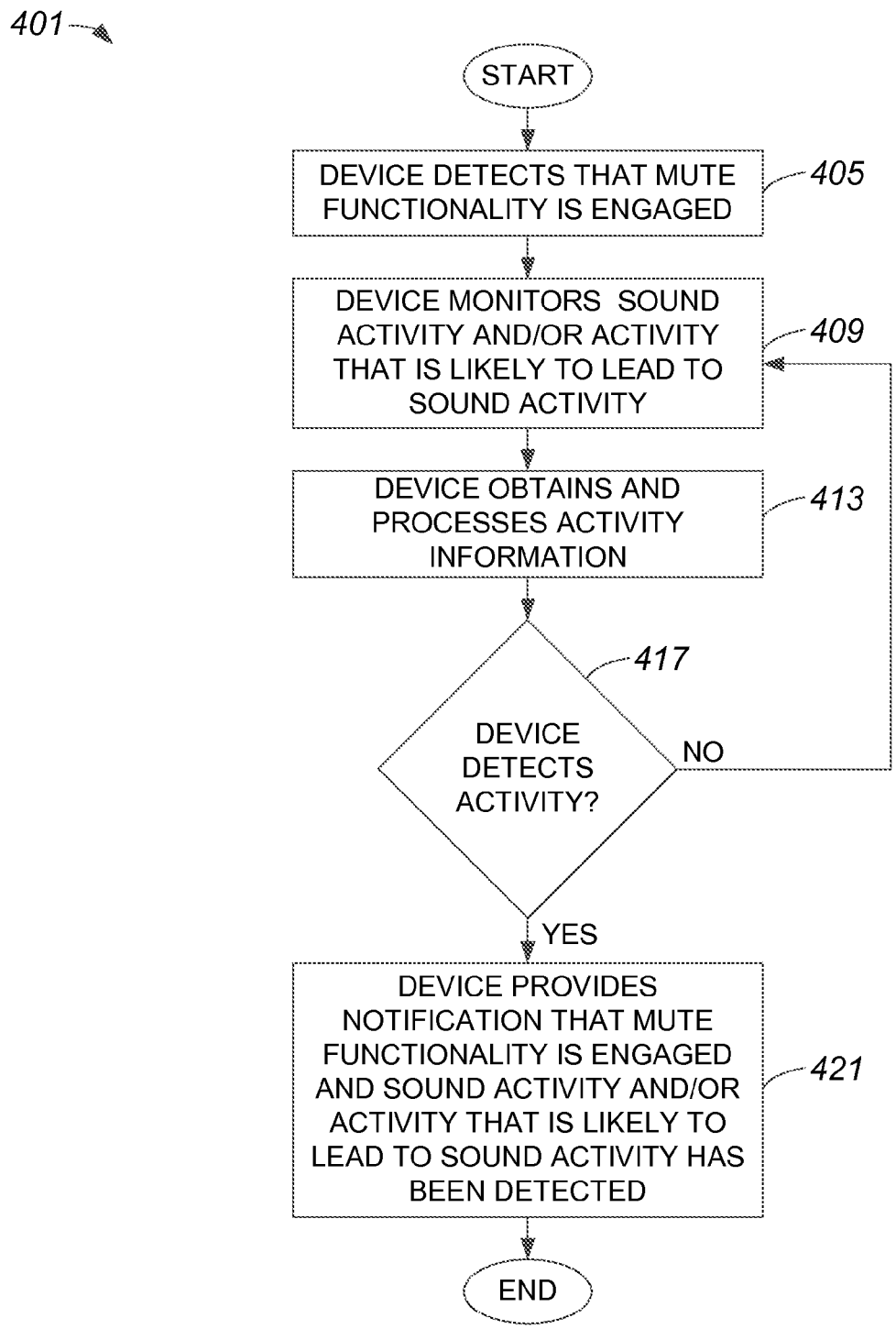
FIG. 4 is a process flow diagram which illustrates a method of operating a device that includes intelligent mute status reminder functionality during a call, e.g., a multi-media conference call, in which the mute status reminder functionality notifies a user when activity that is likely to include or give rise to voice activity is detected in accordance with an embodiment.

With reference to FIG. 4, is a process flow diagram which illustrates a method of operating a device that includes intelligent mute status reminder functionality during a call, e.g., a multi-media conference call, in which the mute status reminder functionality notifies a user when activity that is likely to include or give rise to voice activity is detected will be described in accordance with an embodiment. A method 401 of operating a device that includes intelligent mute status reminder functionality begins at step 405 in which a device, as for example a communications endpoint, detects that mute functionality is engaged.

Once the device detects that mute functionality is engaged, the device monitors the environment around the device for sound activity and/or activity that is considered likely to lead to sound activity, e.g., the sharing of a desktop, in step 409. The device may, in the course of monitoring the environment, effectively collect activity information, or information which indicates that activity such as sound activity or activity relating to manipulating elements associated with a multi-media conference call. In step 413, the device obtains and process activity information.

A determination is made in step 417 as to whether the device has detected activity. If it is determined that the device has not detected activity, process flow returns to step 409 in which the device continues to monitor sound activity and/or activity that is considered to be likely to lead to sound activity. Alternatively, if the device has detected activity in step 417, then in step 421, the device provides a notification that mute functionality is engaged, and that sound activity and/or activity that is likely to lead to sound activity has been detected. Such a notification may be audio and/or visual. In one embodiment, such a notification may provide an indication of the type of activity that has been detected. For example, when a detected activity is a sharing of a desktop, a notification may state that a microphone is muted and desktop sharing has been detected. The method of operating a device that includes intelligent mute status reminder functionality is completed once the notification is provided.

Although only a few embodiments have been described in this disclosure, it should be understood that the disclosure may be embodied in many other specific forms without departing from the spirit or the scope of the present disclosure. By way of example, an intelligent mute status reminder has generally been described as being implemented on a phone and on an endpoint of a conference system. A phone may generally be, but is not limited to being, a softphone, an Internet Protocol (IP) phone, and/or any device that may function as a phone. An endpoint of a conference system may be a phone, in one embodiment. An endpoint of a conference system may also generally be, but is not limited to being, a computing device on which a voice over IP (VoIP) soft client, an instant messaging (IM) client, a voice conferencing client, and/or a web conferencing client executes.

The format in which a notification may be provided to a speaker to warn the speaker that he or she is speaking while his or her microphone is muted may vary widely. Such a notification may be an audio notification, a visual notification, or both. An audio notification, for example, may be a spoken statement that informs a speaker that his or her microphone is muted, or may be an audio tone that is intended to inform the speaker that his or her microphone is muted. A visual notification, for example, may involve a pop-up window that appears on a screen associated with the speaker, and warns the speaker that his or her microphone is muted. In one embodiment, if an indicator, e.g., a light, on a phone or conference endpoint is arranged to indicate that a microphone is muted, the color of the indicator or a pattern of flashing of the indicator may be varied to provide an indication to an active speaker that the microphone is muted. That is, the appearance of a mute indicator may effectively change from a substantially default configuration when a speaker is not detected as speaking to a different configuration when the speaker is detected as speaking.

As will be appreciated by those skilled in the art, when a microphone of a phone is muted, the microphone generally does not effectively output the sound to a communications channel, e.g., a communications channel that enables sound to effectively be transmitted. A microphone may generally be muted by pressing or otherwise engaging a switch or a button to effectively silence sound outputs of the microphone. Similarly, a previously muted microphone may generally be un-muted by pressing or otherwise engaging a switch or a button to allow the microphone to once again produce sound outputs. When a microphone is muted, the microphone is effectively unable to produce or to output sound.

The embodiments may be implemented as hardware and/or software logic embodied in a tangible medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
    capturing samples of sound associated with an environment, the samples of sound being captured by a sensor, wherein the samples of sound are captured while a microphone is muted during a call;
    processing the samples of sound to determine whether the samples of sound likely include voice activity;
    when it is determined that the samples of sound likely include the voice activity, providing a first notification, the first notification being arranged to indicate that voice activity is detected and that the microphone is muted;
    determining, after providing the first notification, whether the microphone continues to be muted;
    when it is determined that the microphone continues to be muted, determining whether to provide a second notification arranged to indicate that the voice activity is detected and that the microphone is muted; and
    when it is determined that the second notification is not to be provided, identifying the samples of sound as including voice activity not intended for distribution with respect to the call.

2. The method of claim 1 wherein the microphone is associated with a device having phone capabilities, the device having a display, and wherein providing the first notification includes providing the first notification on the display.

3. The method of claim 1 wherein the microphone is associated with a device having phone capabilities, the device including an audio playout arrangement, and wherein providing the first notification includes providing the first notification using the audio playout arrangement.

4. The method of claim 3 wherein the device further includes a display, and wherein providing the first notification further includes providing the first notification on the display.

5. The method of claim 1 wherein processing the samples of sound to determine whether the samples of sound likely include the voice activity includes determining at least one energy level associated with the samples of sound and determining whether the at least one energy level indicates the voice activity.

6. The method of claim 5 wherein processing the samples of sound further includes detecting noise included in the samples of sound and suppressing the noise included in the samples of sound.

7. The method of claim 1 further including:
    when it is determined that the second notification is to be provided, providing a second notification, the second notification being arranged to indicate that the voice activity is detected and that the microphone is muted.

8. The method of claim 1 wherein the samples of sound are a first set of samples and the voice activity is a first instance of voice activity, and wherein determining whether to provide the second notification includes:
    capturing additional samples of sound associated with the environment, the additional samples of sound being a second set of samples;
    processing the second set of samples to identify a second instance of voice activity; and
    determining when the second instance of voice activity is a separate instance from the first instance of voice activity.

9. The method of claim 8 wherein when it is determined that the second instance of voice activity is the separate instance from the first instance of voice activity, the method further includes:
    providing the second notification, wherein the second instance of voice activity is the separate instance from the first instance of voice activity when no voice activity is detected for a period of time between the first set of samples and the second set of samples.

10. A tangible, non-transitory computer-readable medium comprising computer program code, the computer program code, when executed, configured to:
    capture samples of sound associated with an environment, wherein the samples of sound are captured while a microphone is muted during a call;
    process the samples of sound to determine whether the samples of sound likely include voice activity;
    when it is determined that the samples of sound likely include the voice activity, provide a first notification, the first notification being arranged to indicate that voice activity is detected and that the microphone is muted;
    determine, after providing the first notification, whether the microphone continues to be muted;
    when it is determined that the microphone continues to be muted, determine whether to provide a second notification arranged to indicate that the voice activity is detected and that the microphone is muted; and
    when it is determined that the second notification is not to be provided, identify the samples of sound as including voice activity not intended for distribution with respect to the call.

11. The tangible, non-transitory computer-readable medium of claim 10 wherein the microphone is associated with a device having phone capabilities, the device having a display, and wherein the computer program code configured to provide the first notification is further configured to provide the first notification on the display.

12. The tangible, non-transitory computer-readable medium of claim 10 wherein the microphone is associated with a device having phone capabilities, the device having an audio playout arrangement, and wherein the computer program code configured to provide the first notification is further configured to provide the first notification using the audio playout arrangement.

13. The tangible, non-transitory computer-readable medium of claim 12 wherein the device further includes a display, and wherein the computer program code configured to provide the first notification is further configured to provide the first notification on the display.

14. The tangible, non-transitory computer-readable medium of claim 10 wherein the computer program code configured to process the samples of sound to determine whether the sample of sound likely include the voice activity is further configured to determine at least one energy level associated with the samples of sound and to determine whether the at least one energy level indicates the voice activity.

15. The tangible, non-transitory computer-readable medium of claim 14 wherein the computer program code configured to process the samples of sound is further configured to detect noise included in the samples of sound and to suppress the noise included in the samples of sound.

16. The tangible, non-transitory computer-readable medium of claim 10 wherein the computer program code is further configured to:
when it is determined that the second notification is to be provided, provide a second notification, the second notification being arranged to indicate that the voice activity is detected and that the microphone is muted.

17. An apparatus comprising:
means for capturing samples of sound associated with an environment, wherein the samples of sound are captured while a microphone is muted during a call;
means for processing the samples of sound to determine whether the samples of sound likely include voice activity;
means for providing a first notification when it is determined that the samples of sound likely include the voice activity, the first notification being arranged to indicate that voice activity is detected and that the microphone is muted;
means for determining, after providing the first notification, whether the microphone continues to be muted;
means for determining whether to provide a second notification arranged to indicate that the voice activity is detected and that the microphone is muted when it is determined that the microphone continues to be muted; and
means for identifying the samples of sound as including voice activity not intended for distribution with respect to the call when it is determined that the second notification is not to be provided.

18. An apparatus comprising:
a communications interface, the communications interface being configured to allow the apparatus to communicate with a communications network to participate in a call;
a microphone arrangement, the microphone arrangement being configured to provide output with respect to the call;
a mute arrangement, the mute arrangement being configured to mute the microphone arrangement to prevent the microphone arrangement from at least temporarily providing the output with respect to the call, wherein the microphone arrangement is configured to capture samples of sound while the microphone arrangement is muted by the mute arrangement;
status reminder logic, the status reminder logic being configured to process the samples of sound to determine when the samples of sound are likely to contain voice activity when the microphone arrangement is muted by the mute arrangement, the status reminder logic further being configured to determine, when the samples of sound are determined to be likely to contain voice activity, whether the samples of sound include voice activity not intended for distribution with respect to the call; and
a notification arrangement, the notification arrangement being configured to provide a first notification that voice activity is likely and that the microphone arrangement is muted by the mute arrangement when it is determined that the samples of sound are likely to contain voice activity, the notification arrangement further configured to determine after providing the first notification, whether the microphone continues to be muted, and when it is determined that the microphone continues to be muted, determining whether to provide a second notification arranged to indicate that the voice activity is detected and that the microphone is muted based on whether the samples of sound include voice activity not intended for distribution with respect to the call.

19. The apparatus of claim 18 wherein the notification arrangement includes a display arrangement, the notification being a visual notification displayed using the display arrangement, and wherein the status reminder logic configured to process the samples of sound to determine when the samples of sound are likely to contain voice activity is configured to determine when sound energy associated with the samples of sound is relatively high for at least a predetermined amount of time.

20. The apparatus of claim 18 wherein the notification arrangement includes an audio playout arrangement, and wherein the notification includes an audible notification provided using the audio playout arrangement.

21. The apparatus of claim 20 wherein the notification arrangement further includes a display arrangement, and wherein the notification further includes a visual notification displayed using the display arrangement.

22. The apparatus of claim 18 wherein the status reminder logic is configured to process the samples of sound to determine whether the samples of sound likely contain voice activity by determining at least one energy level associated with the samples of sound and determining whether the at least one energy level indicates the voice activity.

* * * * *